(12) United States Patent
Ansari et al.

(10) Patent No.: US 9,338,490 B2
(45) Date of Patent: *May 10, 2016

(54) SYSTEM AND METHOD TO PROVIDE A UNIFIED VIDEO SIGNAL FOR DIVERSE RECEIVING PLATFORMS

(71) Applicant: AT&T INTELLECTUAL PROPERTY I, L.P., Atlanta, GA (US)

(72) Inventors: Ahmad C. Ansari, Cedar Park, TX (US); Dinesh Nadarajah, Austin, TX (US); David Bruce Hartman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,983

(22) Filed: Jan. 16, 2015

(65) Prior Publication Data

US 2015/0135210 A1 May 14, 2015

Related U.S. Application Data

(63) Continuation of application No. 13/021,914, filed on Feb. 7, 2011, now Pat. No. 8,966,563, which is a continuation of application No. 11/158,892, filed on Jun. 22, 2005, now Pat. No. 7,908,627.

(51) Int. Cl.
*H04N 7/173* (2011.01)
*H04N 7/16* (2011.01)
(Continued)

(52) U.S. Cl.
CPC ......... *H04N 21/25825* (2013.01); *H04N 7/106* (2013.01); *H04N 7/163* (2013.01);
(Continued)

(58) Field of Classification Search
CPC .............. H04N 21/4356; H04N 21/44008; H04N 21/4402; H04N 21/44028; H04N 21/44029; H04N 21/440245
See application file for complete search history.

(56) References Cited

U.S. PATENT DOCUMENTS

| 4,243,147 A | 1/1981 | Twitchell et al. |
| 4,356,509 A | 10/1982 | Skerlos et al. |

(Continued)

FOREIGN PATENT DOCUMENTS

| WO | 9963759 A2 | 12/1999 |
| WO | 0028689 A2 | 5/2000 |

(Continued)

OTHER PUBLICATIONS

International Search Report and Written Opinion issued on Mar. 9, 2007 for International Application No. PCT/US06/01114, 3 pages.

(Continued)

*Primary Examiner* — Nasser Goodarzi
*Assistant Examiner* — Fred Peng
(74) *Attorney, Agent, or Firm* — Toler Law Group, PC (57) ABSTRACT

A method includes receiving a request for media content at a residential gateway from a device coupled to the residential gateway and sending a media content request to a server based on the request. The method includes receiving a video data stream of the media content at the residential gateway. Data packets of the video data stream enable generation of the media content at a first resolution. A first subset of the data packets include tags that enable identification of particular data packets usable to generate the media content at a second resolution that is lower than the first resolution. The method also includes determining a display characteristic of a display device coupled to the device and sending the particular data packets to the device when the display characteristic indicates that the device is to receive the media content at the second resolution.

20 Claims, 3 Drawing Sheets

(51) Int. Cl.
*H04N 21/2343* (2011.01)
*H04N 21/4402* (2011.01)
*H04N 21/258* (2011.01)
*H04N 7/10* (2006.01)
*H04N 21/435* (2011.01)

(52) U.S. Cl.
CPC . *H04N21/23439* (2013.01); *H04N 21/234327* (2013.01); *H04N 21/234363* (2013.01); *H04N 21/4353* (2013.01); *H04N 21/4358* (2013.01); *H04N 21/44029* (2013.01); *H04N 21/440227* (2013.01)

(56) References Cited

U.S. PATENT DOCUMENTS

| | | |
|---|---|---|
| 4,768,926 A | 9/1988 | Gilbert, Jr. |
| 4,888,819 A | 12/1989 | Oda et al. |
| 4,907,079 A | 3/1990 | Turner et al. |
| 5,126,731 A | 6/1992 | Cromer, Jr. |
| 5,163,340 A | 11/1992 | Bender |
| 5,475,835 A | 12/1995 | Hickey |
| 5,532,748 A | 7/1996 | Naimpally |
| 5,541,917 A | 7/1996 | Farris |
| 5,583,561 A | 12/1996 | Baker et al. |
| 5,589,892 A | 12/1996 | Knee et al. |
| 5,592,477 A | 1/1997 | Farris et al. |
| 5,600,364 A | 2/1997 | Hendricks et al. |
| 5,610,916 A | 3/1997 | Kostreski et al. |
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,812,929 A | 9/1998 | Tsutsui et al. |
| 5,818,438 A | 10/1998 | Howe et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,026,164 A * | 2/2000 | Sakamoto et al. ............ 380/217 |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,133,910 A | 10/2000 | Stinebruner |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,215,483 B1 | 4/2001 | Zigmond |
| 6,222,308 B1 | 4/2001 | Ozawa et al. |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,300,962 B1 | 10/2001 | Wishoff et al. |
| 6,311,214 B1 | 10/2001 | Rhoads |
| 6,314,409 B2 | 11/2001 | Schneck et al. |
| 6,317,884 B1 | 11/2001 | Eames et al. |
| 6,333,917 B1 | 12/2001 | Lyon et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,470,378 B1 | 10/2002 | Tracton et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,535,717 B1 | 3/2003 | Matsushima et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,622,308 B1 | 9/2003 | Raiser |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |

(56) References Cited

U.S. PATENT DOCUMENTS

| | | |
|---|---|---|
| 6,658,568 B1 | 12/2003 | Ginter et al. |
| 6,662,231 B1 | 12/2003 | Drosset et al. |
| 6,671,732 B1 | 12/2003 | Weiner |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,738,421 B1 | 5/2004 | Ueno |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |
| 6,826,775 B1 | 11/2004 | Howe et al. |
| 6,826,776 B1 | 11/2004 | Takano et al. |
| 6,828,993 B1 | 12/2004 | Hendricks et al. |
| 6,864,896 B2 | 3/2005 | Perego |
| 6,898,800 B2 | 5/2005 | Son et al. |
| 6,900,815 B2 | 5/2005 | Yoshioka |
| 6,909,384 B2 | 6/2005 | Baldwin et al. |
| 6,909,874 B2 | 6/2005 | Holtz et al. |
| 6,938,021 B2 | 8/2005 | Shear et al. |
| 7,003,791 B2 | 2/2006 | Mitzutani |
| 7,028,323 B2 | 4/2006 | Franken et al. |
| 7,054,774 B2 | 5/2006 | Batterberry et al. |
| 7,069,573 B1 | 6/2006 | Brooks et al. |
| 7,106,461 B2 | 9/2006 | Kakigi et al. |
| 7,185,355 B1 | 2/2007 | Ellis et al. |
| 7,197,070 B1 | 3/2007 | Zhang et al. |
| 7,207,055 B1 | 4/2007 | Hendricks et al. |
| 7,260,824 B2 | 8/2007 | Du et al. |
| 7,265,797 B2 | 9/2007 | Bae |
| 7,363,305 B2 | 4/2008 | Gabbert et al. |
| 7,363,646 B2 | 4/2008 | White et al. |
| 7,596,799 B2 | 9/2009 | Chen |
| 7,908,627 B2 * | 3/2011 | Ansari et al. .................. 725/90 |
| 2001/0011261 A1 | 8/2001 | Mullen-Schultz |
| 2001/0016945 A1 | 8/2001 | Inoue |
| 2001/0016946 A1 | 8/2001 | Inoue |
| 2001/0034664 A1 | 10/2001 | Brunson |
| 2001/0044794 A1 | 11/2001 | Nasr et al. |
| 2001/0047517 A1 * | 11/2001 | Christopoulos et al. ........ 725/87 |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0097261 A1 | 7/2002 | Gottfurcht et al. |
| 2002/0106119 A1 | 8/2002 | Foran et al. |
| 2002/0112239 A1 | 8/2002 | Goldman |
| 2002/0116392 A1 | 8/2002 | McGrath et al. |
| 2002/0118315 A1 | 8/2002 | Hong |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0152264 A1 | 10/2002 | Yamasaki |
| 2002/0169611 A1 | 11/2002 | Guerra et al. |
| 2002/0170063 A1 | 11/2002 | Ansari et al. |
| 2002/0173344 A1 | 11/2002 | Cupps et al. |
| 2002/0188955 A1 | 12/2002 | Thompson et al. |
| 2002/0193997 A1 | 12/2002 | Fitzpatrick et al. |
| 2002/0194601 A1 | 12/2002 | Perkes et al. |
| 2002/0198780 A1 | 12/2002 | Kawakami et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028890 A1 | 2/2003 | Swart et al. |
| 2003/0030665 A1 | 2/2003 | Tillmanns |
| 2003/0033416 A1 | 2/2003 | Schwartz |
| 2003/0043915 A1 | 3/2003 | Costa et al. |
| 2003/0046091 A1 | 3/2003 | Arneson et al. |
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0071792 A1 | 4/2003 | Safadi |
| 2003/0093793 A1 | 5/2003 | Gutta |
| 2003/0100340 A1 | 5/2003 | Cupps et al. |
| 2003/0110161 A1 | 6/2003 | Schneider |
| 2003/0110503 A1 | 6/2003 | Perkes |
| 2003/0126136 A1 | 7/2003 | Omoigui |
| 2003/0135771 A1 | 7/2003 | Cupps et al. |
| 2003/0141987 A1 | 7/2003 | Hayes |
| 2003/0145321 A1 | 7/2003 | Bates et al. |
| 2003/0149989 A1 | 8/2003 | Hunter et al. |

(56) References Cited

U.S. PATENT DOCUMENTS

| | | |
|---|---|---|
| 2003/0153353 A1 | 8/2003 | Cupps et al. |
| 2003/0153354 A1 | 8/2003 | Cupps et al. |
| 2003/0156218 A1 | 8/2003 | Laksono |
| 2003/0159026 A1 | 8/2003 | Cupps et al. |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189509 A1 | 10/2003 | Hayes et al. |
| 2003/0189589 A1 | 10/2003 | LeBlanc et al. |
| 2003/0189666 A1 | 10/2003 | Dabell et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0215011 A1 | 11/2003 | Wang et al. |
| 2003/0226044 A1 | 12/2003 | Cupps et al. |
| 2003/0226145 A1 | 12/2003 | Marsh |
| 2003/0229900 A1 | 12/2003 | Reisman |
| 2004/0003041 A1 | 1/2004 | Moore et al. |
| 2004/0003403 A1 | 1/2004 | Marsh |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0015997 A1 | 1/2004 | Ansari et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |
| 2004/0049728 A1 | 3/2004 | Langford |
| 2004/0064351 A1 | 4/2004 | Mikurak |
| 2004/0068740 A1 | 4/2004 | Fukuda et al. |
| 2004/0070491 A1 | 4/2004 | Huang et al. |
| 2004/0073918 A1 | 4/2004 | Ferman et al. |
| 2004/0098571 A1 | 5/2004 | Falcon |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0117813 A1 | 6/2004 | Karaoguz et al. |
| 2004/0117824 A1 | 6/2004 | Karaoguz et al. |
| 2004/0123327 A1 | 6/2004 | Fai Ma et al. |
| 2004/0128342 A1 | 7/2004 | Maes et al. |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0148408 A1 | 7/2004 | Nadarajah |
| 2004/0150676 A1 | 8/2004 | Gottfurcht et al. |
| 2004/0150748 A1 | 8/2004 | Phillips et al. |
| 2004/0172658 A1 | 9/2004 | Rakib et al. |
| 2004/0183839 A1 | 9/2004 | Gottfurcht et al. |
| 2004/0194136 A1 | 9/2004 | Finseth et al. |
| 2004/0198386 A1 | 10/2004 | Dupray |
| 2004/0201600 A1 | 10/2004 | Kakivaya et al. |
| 2004/0210633 A1 | 10/2004 | Brown et al. |
| 2004/0210935 A1 | 10/2004 | Schein et al. |
| 2004/0213271 A1 | 10/2004 | Lovy et al. |
| 2004/0221302 A1 | 11/2004 | Ansari et al. |
| 2004/0223485 A1 | 11/2004 | Arellano et al. |
| 2004/0226035 A1 | 11/2004 | Hauser, Jr. |
| 2004/0226045 A1 | 11/2004 | Nadarajah |
| 2004/0239624 A1 | 12/2004 | Ramian |
| 2004/0252119 A1 | 12/2004 | Hunleth et al. |
| 2004/0252120 A1 | 12/2004 | Hunleth et al. |
| 2004/0252769 A1 | 12/2004 | Costa et al. |
| 2004/0252770 A1 | 12/2004 | Costa et al. |
| 2004/0260407 A1 | 12/2004 | Wimsatt |
| 2004/0261116 A1 | 12/2004 | McKeown et al. |
| 2004/0267729 A1 | 12/2004 | Swaminathan et al. |
| 2004/0268393 A1 | 12/2004 | Hunleth et al. |
| 2005/0027851 A1 | 2/2005 | McKeown et al. |
| 2005/0028208 A1 | 2/2005 | Ellis et al. |
| 2005/0031031 A1 | 2/2005 | Osorio |
| 2005/0038814 A1 | 2/2005 | Iyengar et al. |
| 2005/0044280 A1 | 2/2005 | Reisman |
| 2005/0097612 A1 | 5/2005 | Pearson et al. |
| 2005/0132295 A1 | 6/2005 | Noll et al. |
| 2005/0149988 A1 | 7/2005 | Grannan |
| 2005/0195961 A1 | 9/2005 | Pasquale et al. |
| 2005/0251827 A1 | 11/2005 | Ellis et al. |
| 2006/0026663 A1 | 2/2006 | Kortum et al. |
| 2006/0037043 A1 | 2/2006 | Kortum et al. |
| 2006/0037083 A1 | 2/2006 | Kortum et al. |
| 2006/0048178 A1 | 3/2006 | Kortum et al. |
| 2006/0077921 A1 | 4/2006 | Radpour |
| 2006/0114360 A1 | 6/2006 | Kortum et al. |
| 2006/0114987 A1 | 6/2006 | Roman |
| 2006/0117347 A1 | 6/2006 | Steading |
| 2006/0117374 A1 | 6/2006 | Kortum et al. |
| 2006/0123445 A1 | 6/2006 | Sullivan et al. |
| 2006/0156372 A1 | 7/2006 | Cansler, Jr. et al. |
| 2006/0158368 A1 | 7/2006 | Walter et al. |
| 2006/0161953 A1 | 7/2006 | Walter et al. |
| 2006/0168610 A1 | 7/2006 | Noil Williams et al. |
| 2006/0170582 A1 | 8/2006 | Kortum et al. |
| 2006/0174279 A1 | 8/2006 | Sullivan et al. |
| 2006/0174309 A1 | 8/2006 | Pearson |
| 2006/0179466 A1 | 8/2006 | Pearson et al. |
| 2006/0179468 A1 | 8/2006 | Pearson |
| 2006/0184991 A1 | 8/2006 | Schlamp et al. |
| 2006/0184992 A1 | 8/2006 | Kortum et al. |
| 2006/0190402 A1 | 8/2006 | Patron et al. |
| 2006/0218590 A1 | 9/2006 | White |
| 2006/0230421 A1 | 10/2006 | Pierce et al. |
| 2006/0236343 A1 | 10/2006 | Chang |
| 2006/0268917 A1 | 11/2006 | Nadarajah |
| 2006/0282785 A1 | 12/2006 | McCarthy et al. |
| 2006/0290814 A1 | 12/2006 | Walter |
| 2006/0294553 A1 | 12/2006 | Walter et al. |
| 2006/0294561 A1 | 12/2006 | Grannan et al. |
| 2006/0294568 A1 | 12/2006 | Walter |
| 2007/0011133 A1 | 1/2007 | Chang |
| 2007/0011250 A1 | 1/2007 | Kortum et al. |
| 2007/0021211 A1 | 1/2007 | Walter |
| 2007/0025449 A1 | 2/2007 | Van Vleck et al. |
| 2007/0039036 A1 | 2/2007 | Sullivan et al. |
| 2007/0106941 A1 | 5/2007 | Chen et al. |
| 2007/0118857 A1 | 5/2007 | Chen et al. |
| 2007/0237219 A1 | 10/2007 | Schoenblum |
| 2008/0104647 A1 | 5/2008 | Hannuksela |
| 2011/0167442 A1 | 7/2011 | Ansari et al. |

FOREIGN PATENT DOCUMENTS

| | | |
|---|---|---|
| WO | 0160066 A1 | 8/2001 |
| WO | 0217627 A2 | 2/2002 |
| WO | 02058382 A1 | 7/2002 |
| WO | 03003710 A1 | 1/2003 |
| WO | 03025726 A1 | 3/2003 |
| WO | 2004018060 A2 | 3/2004 |
| WO | 2004032514 A1 | 4/2004 |
| WO | 2004062279 A1 | 7/2004 |
| WO | 2005045554 A2 | 5/2005 |
| WO | 2006088577 A3 | 8/2006 |

OTHER PUBLICATIONS

Kapinos, S., "Accenda Universal Remote Control Targets Needs of Elderly, Visually Impaired, Physically Challenged . . . and the Rest of Us," Press Release, Dec. 15, 2002, Innotech Systems Inc., Port Jefferson, NY, 4 pages.

* cited by examiner

FIG. 3

SYSTEM AND METHOD TO PROVIDE A UNIFIED VIDEO SIGNAL FOR DIVERSE RECEIVING PLATFORMS

PRIORITY CLAIM

The present application is a continuation of, and claims priority to, U.S. patent application Ser. No. 13/021,914, filed Feb. 7, 2011, which is a continuation of U.S. patent application Ser. No. 11/158,892, filed Jun. 22, 2005 (now U.S. Pat. No. 7,908,627), each of which is incorporated by reference herein in its entirety.

BACKGROUND

The public's desire to extend communication to mobile devices and to other display systems in their homes continues to grow. Internet service providers, telephone companies, cable TV companies, entertainment/media providers, satellite companies, and businesses generally continue to make additional video offerings available to consumers. These new video offerings typically have improved video quality. While high quality video may be truly appreciated on a high-end display device such as a sixty-inch plasma high definition television set, the impact of a high resolution, high quality data stream, may be lost on the small two square inch display of a cellular telephone. Unfortunately, certain techniques for transmitting video data and managing communications between various devices of a modern video network have several shortcomings.

DETAILED DESCRIPTION

Consumers continue to desire new and additional features for home entertainment services, and consumers continue to purchase electronic devices with a wide variety of displays. Accordingly, a system and method for supplying the consumer with a large variety of data transmissions in terms of resolutions and frame rates is provided herein. In one exemplary configuration, a communication system is configured to provide a single video data stream to a subscriber, wherein the single data stream can provide video data to multiple receiving devices with diverse video data input requirements. The communication system can include a digitizer that converts an analog video signal into a high-resolution digital video signal (HRDVS). The communication system can also include a signal processing engine that receives the HRDVS, compresses the HRDVS signal, creates video packets from the HRDVS, and identifies at least a portion of the video packets for distribution to different resolution devices.

A transmitter can be coupled to the signal-processing engine to transmit the video packets to a subscriber location such as a business or a residence. The communication system can also include a remote gateway or a set top box for receiving the transmitted video packets at the subscriber location. After receipt of the video packets, the remote gateway can distribute the video packets to a first video display device capable of displaying the high resolution content and distribute a portion of identified video packets to a second video display device capable of displaying a lower resolution version of the high resolution content.

In accordance with one configuration, the video packets in a high-resolution data stream can include multiple identifiers. For example, every third video packet may be identified for a medium quality picture while every ninth packet may be identified for a cellular telephone display. Thus, every ninth packet will receive a dual identity and be part of more than one "lower resolution" subset. In accordance with another configuration some video packets may be identified for a specific device type or display resolution while other video packets may be identified for a specific device, such as a Palm Pilot III® with a specific Internet protocol address.

Packets may also be identified for a display parameter, such as a display resolution (e.g., 750 pixels by 750 pixels) or a frame rate. For example, every tenth packet may be identified for a 750 pixel by 750-pixel display wherein every thirtieth packet may be identified for devices having a 200 pixel by 200-pixel display. The packets may also be tagged by sampling the data stream at predetermined intervals and tagging the sampled packet. Thus, packets can be tagged and eventually grouped by classifications based, for example, on display device resolution parameters and frame rates.

When a receiving device, such as a residential gateway, distributes the HRDVS, the entire HRDVS stream received by the residential gateway may be sent to high resolution display devices while packets in the HRDVS having a first identifier can be "split off" and transmitted to a second classification of video devices and packets having a second identifier can be split off and transmitted to a third classification of video display device. Thus, the original HRDVS stream can be filtered or pared down such that devices that do not require high data rates or high quality video can be provided with a signal that is commensurate with their display capabilities.

As indicated above, identifiers or tags may be used to signal which packets in a given high resolution video stream should be included in a lower resolution version of the video stream. In such an embodiment, if a high-resolution frame includes an identifier; the high-resolution frame or packet would be included in a low-resolution version of the video. If a high-resolution frame does not include an identifier, the high-resolution frame would not be included in a low-resolution version of the video.

While much of the following description focuses on systems that use identifiers to indicate which packets/frames should be included, identifiers could also be used to tag packets/frames that can be dropped from lower resolution video streams. In a "Tag/Drop" embodiment, a high-resolution packet/frame that includes a particular identifier would not be included in a low-resolution version of the video. A system designer may consider several factors when determining whether to implement a "Tag/Keep" model verse a "Tag/Drop" model. Moreover, the system designer may include different types of tags. One type of tag may be interpreted as a "Keep" tag while a different type of tag may be interpreted as a "Drop" tag. In some cases, a given Keep tag may "tell" a system component to include the following X number of frames. The tag may also suggest that all of the following packets/frames should be kept until the system sees a "Drop" tag. The type, number, and characteristics of identifiers may be modified to suit a given design goal.

Providing video in a format that is compatible with device display parameters can greatly reduce the cost of equipment and infrastructure needed to provide service to multiple and diverse video receiving platforms. For example, a high definition television can receive an entire data stream, yet a personal digital assistant, a cellular telephone, or an older television may only receive a subset of the data. Because the lower resolution data is integrated with, and essentially a duplicate of portions of the HRDVS stream, only minimal processing effort and minimal additional transmission infrastructure is required to implement such a system.

The improvements in communication through digital technology can be utilized herein to provide enhanced video display quality. Likewise, more efficient compression and transmission algorithms can be utilized to compress video and multimedia content to create a wide range of different types of content for different viewing devices. For example, the high definition (HD) content or HDTV is one example of the type of content that is becoming more and more popular.

Video is no longer viewed on just older analog television monitors. Today, HD monitors are becoming more affordable, and personal computers and laptops can be configured to display video. Wireless phones, PDAs, iPODs®, pocket video games and a variety of other devices with networking capabilities are also capable of receiving and displaying video content within the home. Thus, it is desirable that video data destined for older video display equipment and devices having small displays can be efficiently delivered to such devices.

In one configuration, a service provider can offer similar types of services to different viewing platforms such as television sets, PCs and laptops, PDAs, iPODs and other devices with reception and display capabilities. The illustrative embodiment offers a unified architecture that provides a high quality signal for each different type of viewing device without requiring transmission of many different types of signals having redundant data. The illustrative embodiment also provides reliable security and digital rights management for content protection by guarantying that only authorized or selected devices will receive data that is intended for the specific device.

Figure 1:
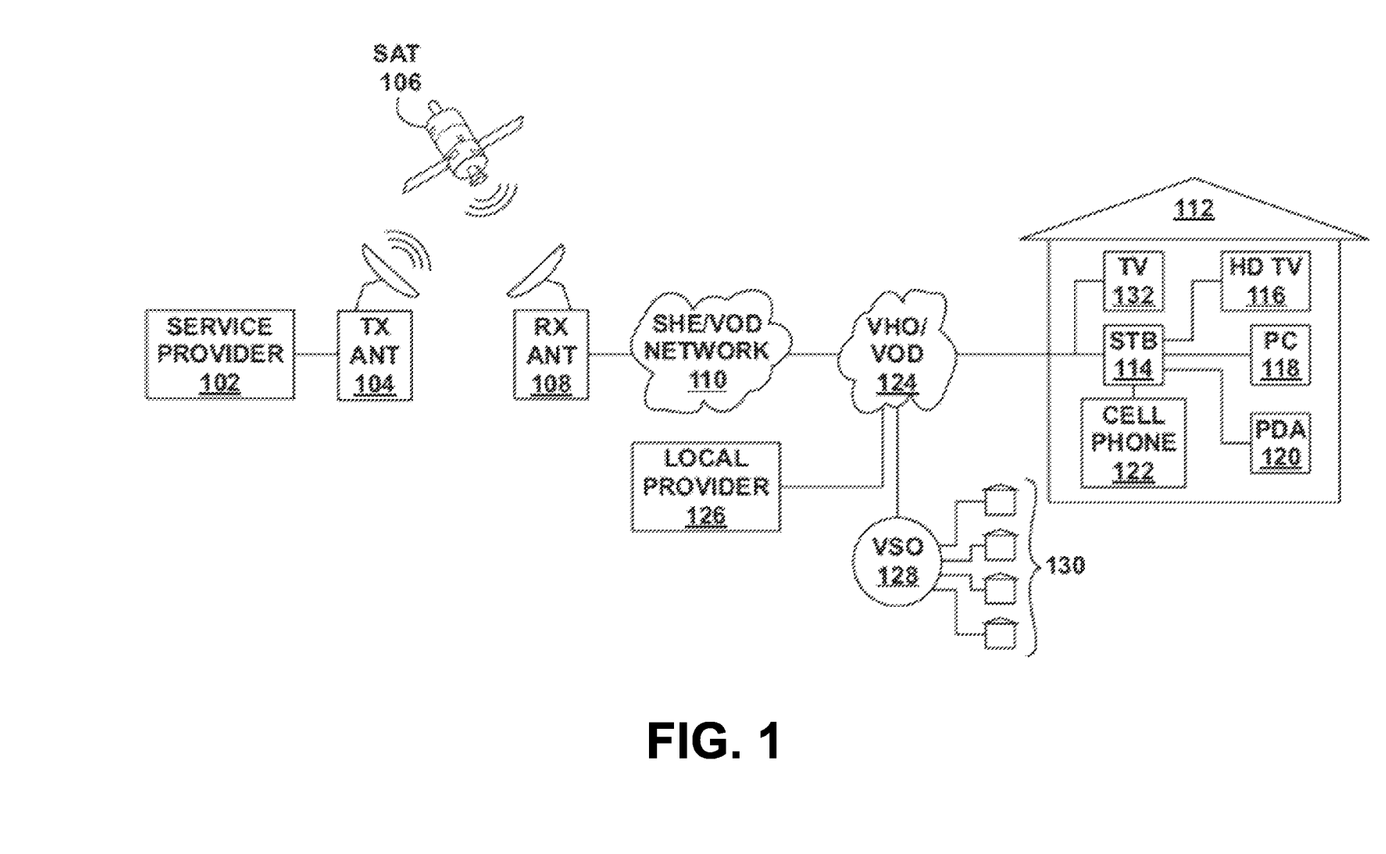
FIG. 1 presents a block diagram of a service provider network that can be utilized to provide communication to a subscriber location.

FIG. 1 shows an exemplary high-level block diagram of an entertainment video distribution network. In one entertainment video distribution architecture, content is acquired by, or stored by a content service provider 102. The content service provider 102 can supply entertainment video to a subscriber location 112, for example, via a satellite transmitter 104, a satellite 106, and a satellite receiver 108. The satellite receiver 108 can supply video to off-air receiver at a super head end (SHE) 110. The SHE 110 can have a video on demand (VoD) server that receives control signals from a subscriber and responsive to the control signals provides requested content to the subscriber location 112. At the SHE 110, video can be compressed and distributed to a metropolitan video hub office (VHO) 124.

Additional content such as local content may be acquired from local providers or other providers at the VHO 124. Depending on the VoD architecture and the number of subscribers supported, VoD servers may also be located at the VHO 124. Local provider 126, such as a local television station, can provide video to the VHO 124. Locally acquired content at the VHO 124 can also be digitized and compressed at the VHO 124 and combined with the content received from the SHE 110.

The combined content can be directly distributed to subscribers as is illustrated by the connection to subscriber location 112. The content/combined content can also be distributed to additional local Video Serving Offices (VSOs) 128. Depending on the distribution and access architecture desired, the VSO 128 can distribute the content to a plurality of individual subscriber's homes 130, businesses or access points (not shown). In one configuration a very high speed digital subscriber line (VDSL) configuration is utilized between the subscriber location 112 and the VHO 124, however alternate configurations, such as fiber to the curb and other configurations, could be utilized.

In a cable Hybrid Fiber Coax (HFC) architecture (an implementation using fiber optic components and cable components), analog RF modulation, and digital quadrature amplitude modulation (QAM) techniques can be utilized to broadcast the content from the VHO to a residential gateway or a set top box (STB) 114. These techniques can also be utilized when analog service is provided directly to a standard television set 132 at the subscriber location 112. Additional configurations, such as fiber to the premise (FTTP), fiber to the curb (FTTC) and other access network technologies, could be utilized to provide a signal to the subscriber.

In one implementation, a switched digital video (SDV) architecture is utilized to multicast the video content to a particular point on the network (possibly a VHO) that is proximate to the end-users' location. In this configuration, channel requests and switching can be administrated at the VHO 124 eliminating the need for a sophisticated STB 114. However, in both configurations, the STB 114 may be used to communicate via control signals and digital video signals. In one configuration, the STB 114 decodes the authorized channel and displays the content on a high definition television (HDTV) monitor 116.

As is illustrated, many different types of receiving devices, such as an analog television 132, a cellular telephone 122, a personal digital assistant 120, and a personal computer 118, may be a receiver at a subscriber location 112. In one configuration, similar yet lower resolution content compared to that provided to HD TV 116 is provided to such devices. Depending upon implementation detail, if each display device were to be provided with high resolution (HR) content, the set top box 114 would be costly because it would be required to have significant data processing capacity. A system that provides HD or HR video to multiple devices could prove cost prohibitive for many consumers.

Thus, it would be desirable to provide a common signal or unified signal to set top boxes or gateways and allocate portions of the high-resolution signal to lower resolution devices. In this configuration, each device, such as mobile telephone 122, personal digital assistant 120 and personal computer 118, can receive an optimized version of the video signal based on a the display capacity or display resolution of the device. The selective distribution of video data in accordance with the present disclosure can be implemented utilizing HFC networks as well as switched digital video (SDV) networks.

In the exemplary embodiment, a single communication link is illustrated; however, hundreds and even thousands of links similar to the one shown can be supported by the teachings of the present disclosure. Although a household is shown in the illustrative embodiment as the subscriber location, the subscriber could be at any location having broadband access.

Figure 2:
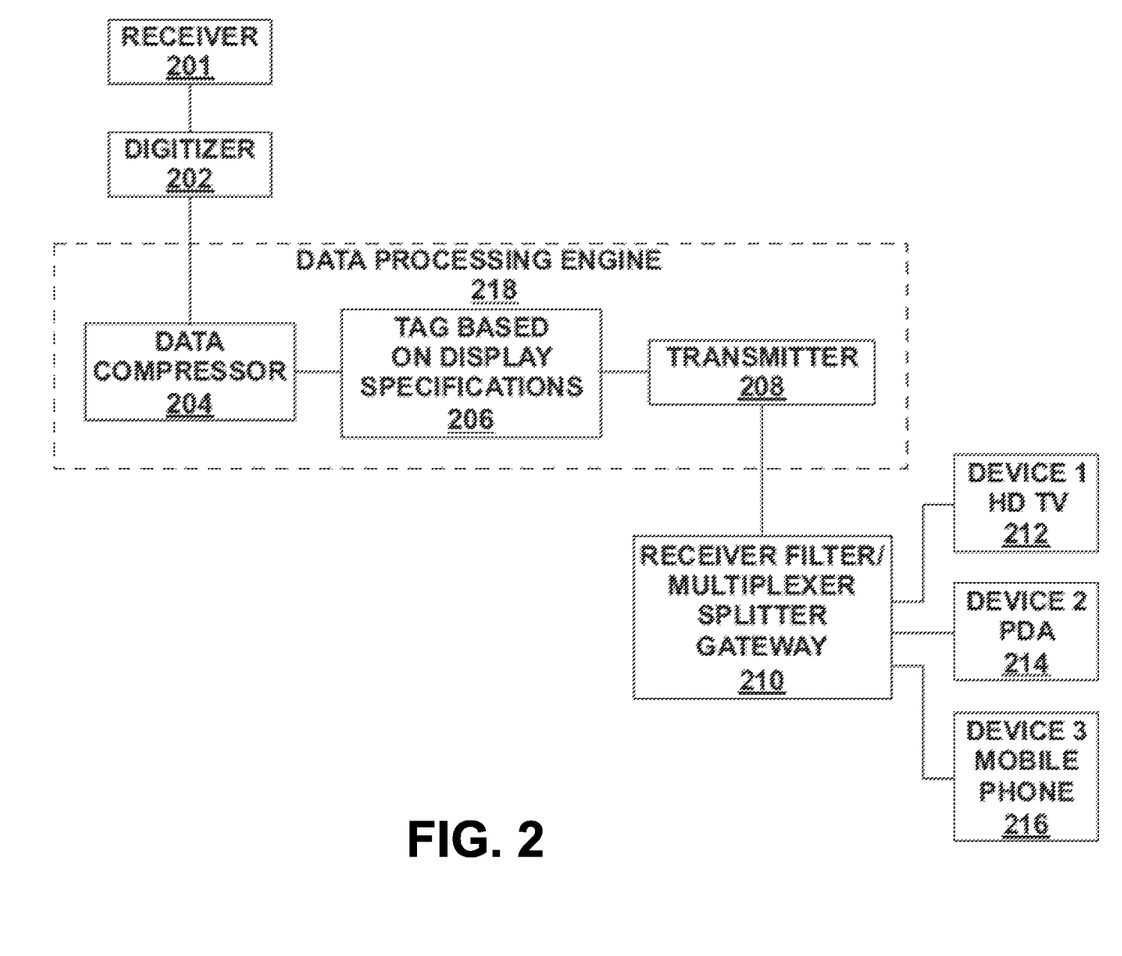
FIG. 2 shows a block diagram of possible components to process and transmit video signals.

FIG. 2 provides an illustrative embodiment that depicts a block diagram for processing video signals and providing video signals to a subscriber. A receiver 201, possibly located at the SHE in FIG. 1, can receive video data from an entertainment provider (not shown). The receiver 201 can supply a digitizer 202 with analog content, and the digitizer 202 can digitize the analog content and supply digital data to a data compressor 204 where the data can be compressed. The data compressor 204 can also be referred to as a "compression CODEC" or "coder/decoder." Data compressor 204 can remove spatial and temporal redundancies that are inherently present in images and moving sequences of video. Removal of these redundancies reduces the number of data packets that need to be transmitted and hence reduces the workload of transmitting and receiving devices and other data processing devices in the transmission configuration.

Many types of compression technology could be utilized in cooperation with the present disclosure to reduce the transmission workload/payload of network components. Depending on the compression technology, the data compressor 204 can transform the image/video data into a set of compressed data that contains different types of parameters. Most existing video compression standards use discrete cosine transform (DCT) to remove spatial redundancies in the video data. Likewise, a variety of motion estimation techniques can be utilized to reduce temporal redundancies.

A large number of different filtering and pixel manipulation techniques can also be utilized to reduce compression artifacts and produce good quality video while minimizing the volume of the transmissions. A typical compression technique generates a number of DCT coefficients, motion vectors, and other parameters that are then encoded into the data stream using a variety of encoding techniques. Many different compression techniques could be utilized to complement the present disclosure without parting from the scope of its teachings.

In accordance with the teachings herein, some subscriber display devices may operate satisfactorily with a low-resolution signal, others a medium-resolution signal, while others a high resolution or high-definition signal. Further, other devices may effectively utilize a signal having a resolution somewhere between the above resolutions.

A data tagger 206 can receive the compressed signal and tag packets in the data transmission that can be utilized by lower resolution devices to provide a satisfactory video. Tagging can be performed on a timing basis (i.e., every millisecond), based on a packet count or with any other reliable sampling process. Portions of the transmission may be identified or tagged for specific devices or specific device types that can function on less data capacity than a high definition transmission. Tagging packets in a video data stream avoids transmission of duplicate packets or duplicate signals and reduces the workload of system components. In one configuration, the data tagger 206 may tag a high-resolution or high definition video packet stream with multiple types of tags to provide multiple levels of lower resolutions. The packets may also be tagged based on various device types and display parameters. The high resolution/definition data (as tagged) can then be forwarded to and transmitted by transmitter 208.

Although illustrated as separate modules data compressor 204, the data tagger 206 and the transmitter 208 can be considered as a data processing engine 218. The data processing engine 218 can use trans-coding equipment located in the distribution network or at the customer premise to provide different versions of the content for different types of viewing devices at the customer or subscriber premise.

Thus, a single transmission having tagged data can be sent from the data processing engine 218 to the receiver-filter 210 and this transmission can be filtered to provide different display resolutions to devices having different display data requirements. The receiver-filter 210 can be locate within a set top box, such as the set top box in FIG. 1

The receiver 210 can retransmit or deliver all the data packets to a high-resolution device, such as a HDTV 212, and parse, filter, split, or multiplex data packets from the high definition data stream to deliver a first subset of the packets (i.e., packets tagged with a first identifier) to PDA 214 and deliver a second subset of the packets (i.e., packets tagged with a second identifier) to mobile phone 216. The receiver 210 can also provide security from eavesdropping by implementing digital rights management procedures such that the appropriate signal is transmitted to and received by the appropriate device.

In one configuration, reliable security and/or digital rights management capabilities can also be utilized to safeguard the content of the transmission. All viewing end-points or video devices 212-216 may initially register with the receiver-filter 210 (e.g., the set top box or the residential gateway). The receiver-filter 210 can provide encryption keys, and the communications from the receiver-filter 210 to the display device 212-216 can be encrypted or scrambled such that only the registered subscriber video devices can decode and display the video transmitted by the receiver-filter 210. Digital rights management can be particularly useful in wireless communications. The receiving devices 212-216 may also execute a routine to identify their characteristics, such as a screen size or an optimal and minimal display resolution, such that the receiver-filter 210 can optimize the filtering process for each device. Specific display devices can be provided with an optimal subset of compressed data based on the identified operational device parameters.

Figure 3:
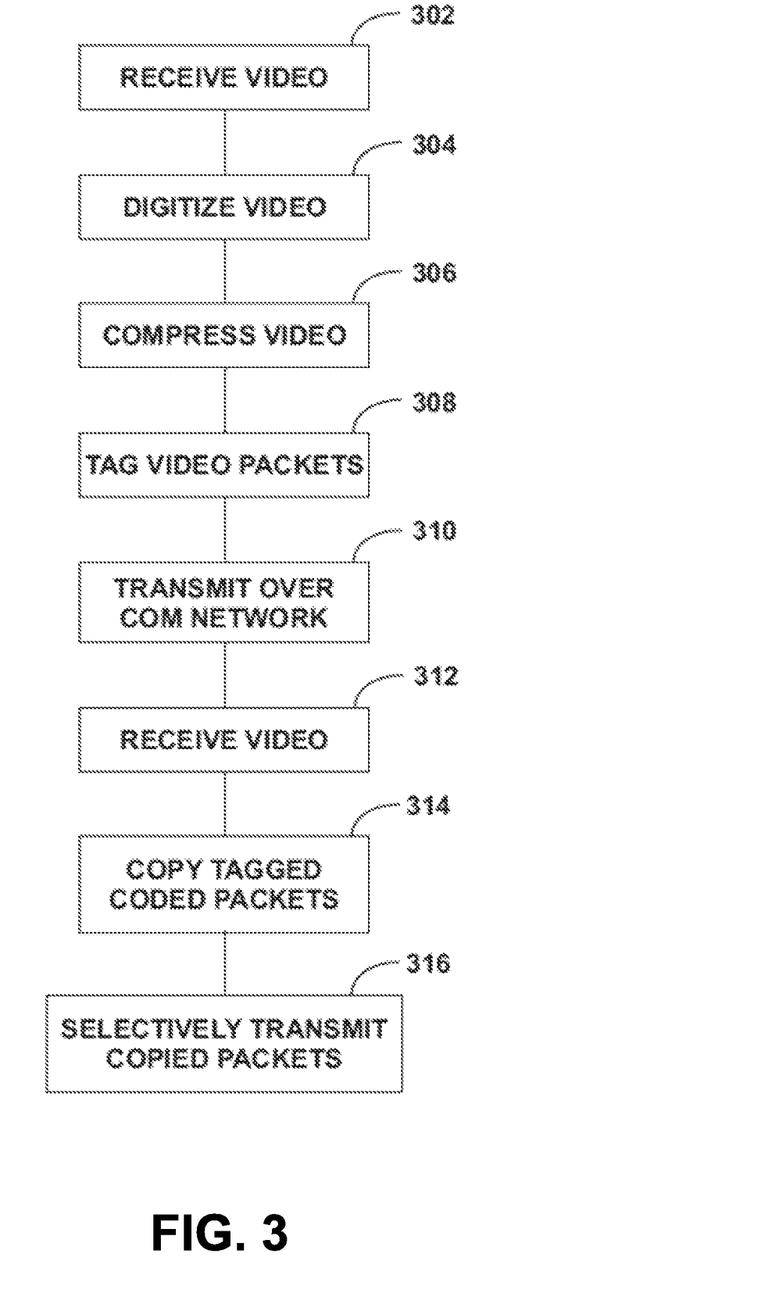
FIG. 3 presents a flow diagram in accordance with a method for providing a unified signal to diverse video devices.

Referring to FIG. 3 a method for providing a unified video stream usable by diverse receiving platforms is provided. At 302, video data is received or acquired possibly at a SHE or a VHO. If the video data is received in an analog format, it can be converted to a digital video signal, at 304. The video data may be encoded or digitized into a high-resolution format or a format that is designed as the highest viewing quality available (i.e., currently for HD consumer television sets).

At 306, the digitized video can be compressed and, at 308, the digitized compressed high-resolution video can be tagged such that portions of the compressed video can be identified and "copied out" to form duplicate data that forms a subset of the high-resolution video. Each subset being useable by lower resolution displays.

In one configuration, the data can be tagged with different types of tags such that each subset has a specific tag and can therefore be identified for distribution to a specific device type, resolution frame rate, viewing specification or screen size. The identification can occur such that each identified portion of the compressed data is optimized or has a high enough data rate to provide quality viewing but does not provide data in excess of that necessary to provide the quality video to each device.

The entire video data stream (the high resolution signal with the embedded tags) can be transmitted over a communication network, at 310. The video can be received, at 312, by a receiving device such as a set top box or a residential gateway. Many receivers and receiving methodologies could be utilized. For example, a SDV network, a VDSL network, or a master STB for an HFC network could be utilized to transport and switch the video data. At 314, the tagged portions of the video data can be copied and buffered and then transmitted to the appropriate devices while the high-resolution data, the "highest quality data" or the entire data stream can be sent intact to the high resolution/definition video devices, at 316. Different tags, tagging schemes and different tagging time intervals can be applied to the data for different devices or different display areas in accordance with the scope of the present disclosure.

The above-disclosed subject matter is to be considered illustrative, and not restrictive, and the appended claims are intended to cover all such modifications, enhancements, and other embodiments that fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving a request for media content at a residential gateway from a device associated with the residential gateway;
sending a media content request from the residential gateway to a server based on the request;
receiving a video data stream of the media content at the residential gateway responsive to the media content request, wherein data packets of the video data stream enable generation of the media content at a first resolution, and wherein a first subset of the data packets include tags that enable identification of particular data packets usable to generate the media content at a second resolution that is lower than the first resolution;
determining, at the residential gateway, a display characteristic of a display device coupled to the device; and
sending the particular data packets from the residential gateway to the device when the display characteristic indicates that the device is to receive the media content at the second resolution.

2. The method of claim 1, wherein the particular data packets include the tags.

3. The method of claim 1, wherein the particular data packets do not include the tags.

4. The method of claim 1, further comprising sending all of the data packets to the device when the display characteristic indicates that the device is to receive the media content at the first resolution.

5. The method of claim 1, wherein sending the particular data packets includes:
encrypting the particular data packets to generate encrypted data packets; and
sending the encrypted data packets to the device.

6. The method of claim 1, wherein the media content includes media-on-demand content.

7. The method of claim 1, wherein the particular data packets of the data packets include second tags, and wherein the tags and the second tags enable the residential gateway to provide the media content to the device at a third resolution that is lower than the second resolution when the display characteristic indicates that the device is to receive media content at the third resolution.

8. The method of claim 7, wherein the first resolution corresponds to a high definition resolution, wherein the second resolution corresponds to a standard definition resolution, and wherein the third resolution corresponds to a resolution for a portable communication device.

9. The method of claim 8, wherein the portable communication device includes a mobile communications device, a personal digital assistant, or a video game device.

10. A computer-readable storage device comprising instructions executable by a processor of a residential gateway to perform operations including:
receiving a request for media content from a device associated with the residential gateway;
sending a media content request to a server based on the request;
receiving a video data stream of the media content responsive to the media content request, wherein data packets of the video data stream enable generation of the media content at a first resolution, and wherein a first subset of the data packets include tags that enable identification of particular data packets usable to generate the media content at a second resolution that is lower than the first resolution;
determining a display characteristic of a display device coupled to the device; and
sending the particular data packets to the device when the display characteristic indicates that the device is to receive the media content at the second resolution.

11. The computer-readable storage device of claim 10, wherein the particular data packets include the tags.

12. The computer-readable storage device of claim 10, wherein the particular data packets do not include the tag.

13. The computer-readable storage device of claim 10, wherein the operations further include:
receiving a registration request from the device; and
sending an encryption key to the device.

14. The computer-readable storage device of claim 13, wherein sending the particular data packets includes:
encrypting the particular data packets to generate encrypted data packets; and
sending the encrypted data packets to the device, wherein the encryption key enables the device to decode the encrypted data packets.

15. The computer-readable storage device of claim 10, wherein determining the display characteristic of the display device includes receiving information from the device, wherein the information include a screen size, a minimum display resolution, a preferred display resolution, or a combination thereof.

16. A media device comprising:
a processor;
a memory coupled to the processor, the memory including instructions executable by the processor to perform operations including:
receiving a request for media content from a device coupled to the media device;
sending a media content request to a server based on the request;
receiving a video data stream of the media content responsive to the media content request, wherein data packets of the video data stream enable generation of the media content at a first resolution, and wherein a first subset of the data packets include tags that enable identification of particular data packets usable to generate the media content at a second resolution that is lower than the first resolution;
determining a display characteristic of a display device coupled to the device; and
sending the particular data packets to the device when the display characteristic indicates that the device is to receive the media content at the second resolution.

17. The media device of claim 16, wherein the device is wirelessly coupled to the media device.

18. The media device of claim 16, wherein the media device comprises a set-top box device.

19. The media device of claim 16, wherein the particular data packets include the tags.

20. The media device of claim 16, wherein the particular data packets do not include the tags.

* * * * *